United States Patent [19]

Willis

[11] 4,135,457
[45] Jan. 23, 1979

[54] SEED DRILLING UNITS

[75] Inventor: Robert A. Willis, Hythe, England

[73] Assignee: Hestair Stanhay Limited, Ashford, United Kingdom

[21] Appl. No.: 810,467

[22] Filed: Jun. 27, 1977

[30] Foreign Application Priority Data

Jan. 12, 1977 [GB] United Kingdom ............... 1125/77

[51] Int. Cl.² ............................................. A01C 5/00
[52] U.S. Cl. ........................................ 111/52; 111/77;
111/85; 172/245; 172/400; 172/484
[58] Field of Search .................... 111/85, 52, 77, 84,
111/86; 172/400, 484, 250, 253, 245, 624, 619

[56] References Cited

U.S. PATENT DOCUMENTS

| 1,317,402 | 9/1919 | Taylor | 111/85 |
| 2,719,498 | 10/1955 | Goolsby | 111/85 X |
| 3,570,605 | 3/1971 | Rikli | 172/619 X |
| 3,880,100 | 4/1975 | Gillies et al. | 111/77 |
| 3,901,169 | 8/1975 | Ribouleau | 111/52 |
| 3,921,726 | 11/1975 | Connor et al. | 172/484 X |
| 3,923,206 | 12/1975 | Gillies et al. | 111/86 X |

FOREIGN PATENT DOCUMENTS

| 66677 | 3/1892 | Fed. Rep. of Germany | 172/400 |
| 970455 | 1/1951 | France | 172/400 |
| 281051 | 3/1970 | U.S.S.R. | 111/85 |

Primary Examiner—Edgar S. Burr
Assistant Examiner—James R. Feyrer
Attorney, Agent, or Firm—Pollock, Vande Sande and Priddy

[57] ABSTRACT

A towable seed drilling unit of the kind having a hopper-fed seed chamber whose base is constituted by a proportion of the lower run of an endless belt driven by a belt drive roller in a direction contrary to towing direction from a ground-contacting wheel and having regularly spaced holes therein for the containment of single seeds, a seed-repelling roller for agitating seed in the said chamber and a masking plate below the belt permitting release of seeds on a passage of holes therebeyond into a furrow formed ahead of temporarily unmasked holes by a coulter beneath the seed chamber and closed by a furrow closing member, wherein forward and rearward wheels supporting the unit are carried by arms pivotal about substantially horizontal axes and means are provided for adjusting the attitude of the arms relative to the remainder of the unit and thus the penetration depth of the coulter, and wherein a parallel linkage is provided by means of which the unit can be attached to a towing vehicle, said linkage being rendered inoperative when a front wheel is fitted and enabling said front wheel to be removed when said linkage is rendered operative to act in co-operation with said rearward wheel for adjusting the penetration depth of the coulter.

6 Claims, 5 Drawing Figures

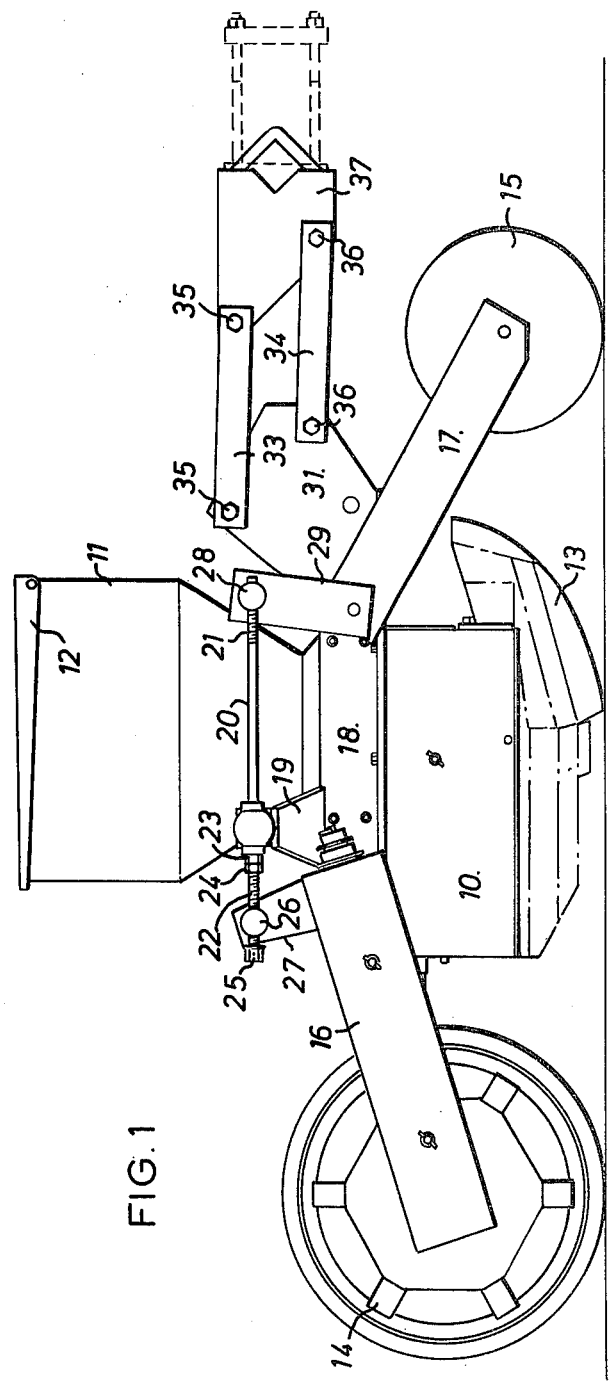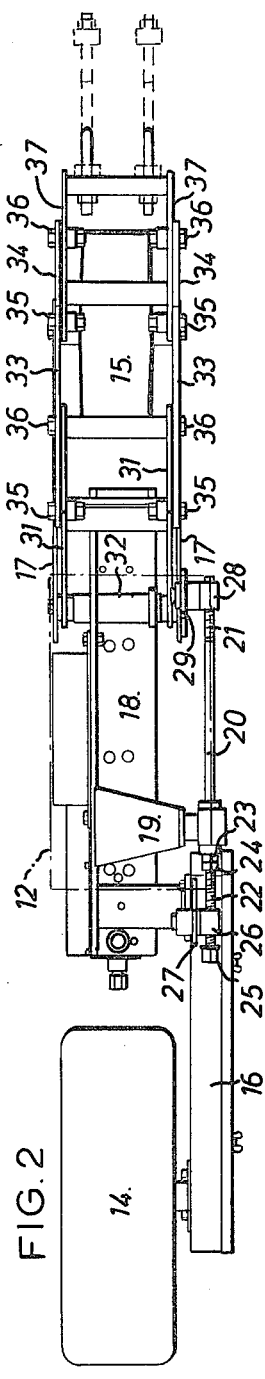

SEED DRILLING UNITS

BACKGROUND OF THE INVENTION

This invention relates to towable seed drilling units and is particularly suitable for seed tablets and encapsulated seeds.

U.S. Pat. No. 3,880,100 (Gillies et al) which is owned by the assignee of the instant application discloses a towable seed drilling unit comprising:

- a seed hopper;
- a seed chamber having walls and a floor formed by a portion of the lower run of an endless belt, said endless belt being regularly perforated by at least one row of holes along its length, each hole being sized to contain a single seed;
- means communicating with said seed hopper and said seed chamber for providing gravity feed between said seed hopper and said seed chamber;
- a seed repelling roller in communication with said endless belt for agitating seed in said seed chamber;
- a masking plate located below said floor formed by said endless belt, the rear edge of said plate being forwardly spaced from said seed repelling roller and unmasking at least one hole in said endless belt through which a seed may fall;
- means including a drive roller for carrying said endless belt;
- a coulter located beneath said seed chamber for forming a furrow ahead of said unmasked hole;
- a furrow closing member located behind said seed chamber for closing said furrow formed by said coulter;
- a first ground contacting wheel located in front of said coulter;
- a second ground contacting wheel located in back of said furrow closing member;
- drive means operably associated with said second ground contacting wheel and said drive roller for driving said lower run of said endless belt in a direction opposite the direction in which said towable seed drilling unit is towed; and
- means including at least one pivot arm attached to said first ground contacting wheel, a linkage system coupled to said at least one pivot arm and a manually adjustable screw operatively associated with said linkage system for adjusting the level of said towable seed drilling unit above the ground.

SUMMARY OF THE INVENTION

The present invention aims to provide an improvement in the towable seed drilling unit described and claimed in the above-mentioned Gilles, et al U.S. patent.

According to the present invention, there is provided a towable seed drilling unit of the kind having a hopper-fed seed chamber whose base is constituted by a proportion of the lower run of an endless belt driven by a belt drive roller in a direction contrary to the towing direction from a ground contacting wheel and having regularly spaced holes therein for the containment of single seeds, a seed-repelling roller for agitating seed in the said chamber and a masking plate below the belt permitting release of seeds on passage of holes therebeyond into a furrow formed ahead of temporarily unmasked holes by a coulter beneath the seed chamber and closed by a furrow closing member, wherein forward and rearward wheels supporting the unit are carried by arms pivotal about substantially horizontal axes and means are provided for adjusting the attitude of the arms relative to the remainder of the unit and thus the penetration depth of the coulter, and wherein a parallel linkage is provided by means of which the unit can be attached to a towing vehicle, said linkage being rendered inoperative when a front wheel is fitted and enabling said front wheel to be removed when said linkage is rendered operative to act in co-operation with said rearward wheel for adjusting the penetration depth of the coulter.

Preferably, the seed drilling unit further includes a disc-type coulter adapted to be fitted in place of the front wheel.

Means for adjusting the attitude of the arms relative to the remainder of the unit and thus the penetration depth of the coulter may comprise a manually operable screw engageable with an extension on each of said arms. The screw is preferably arranged to act only on the arm carrying the rearward wheel when the front wheel is not fitted.

The seed drilling unit preferably also includes a main frame or spine on which the hopper, seed chamber, coulter, furrow closing member and coulter depth adjusting means are mounted and to which the arms are pivotally connectable.

According to a preferred embodiment of the invention, the parallel linkage is connected to the main frame or spine by at least one plate which is connected to the frame or spine by a shaft for pivotal movement with respect thereto when the front wheel is fitted and which is locked against pivotal movement when the front wheel is not fitted.

BRIEF DESCRIPTION OF THE DRAWINGS

The invention will now be further described, by way of example, with reference to the accompanying drawings, in which:

FIG. 1 is a side elevation of one embodiment of a seed drilling unit according to the invention fitted with a front wheel;

FIG. 2 is a plan view of the unit illustrated in FIG. 1;

In the drawings, like parts are denoted by like reference numerals.

DETAILED DESCRIPTION OF THE INVENTION

Figure 3:
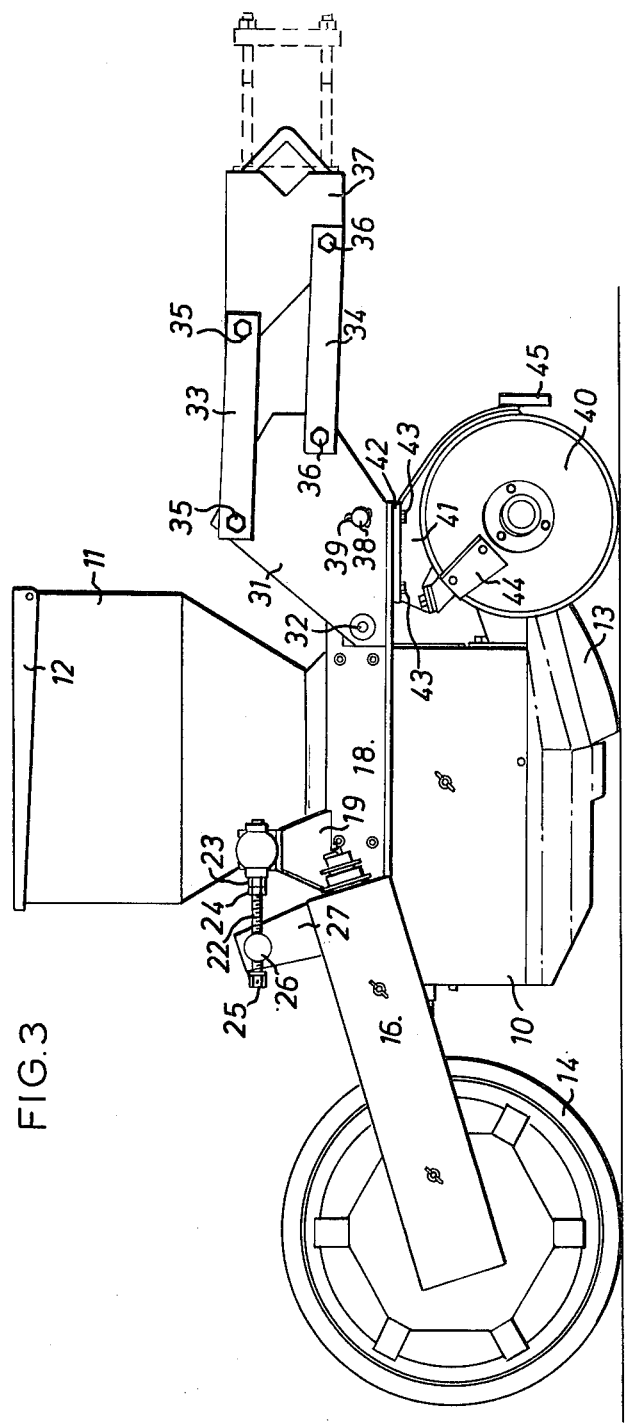
FIG. 3 is a side elevation corresponding to FIG. 1 of the unit with the front wheel replaced by a disc coulter.

Referring to the drawings, the seed drilling unit comprises a seed metering device 10 on which is mounted a seed hopper 11, which is closable by a lid 12 pivotally mounted on the hopper, and a coulter 13 of the runner type. The seed metering device 10 takes the form of the device described and illustrated in Gilles et al U.S. Pat. No. 3,880,100 and reference should be made to that specification for a full description of this device.

The drilling unit is supported by a rear wheel 14 and, in the form illustrated in FIG. 1, by a front wheel 15. The rear wheel 14 is rotatably mounted by means of bearings in one end of an arm 16 the other end of which is pivotally mounted on a main frame or spine 18 of the drilling unit to which the metering device 10 is also connected. Similarly, in FIG. 1, the front wheel 15 is rotatably mounted by means of bearings in one end of an arm 17, the other end of this arm being likewise pivotally mounted on the frame or spine 18. The or each wheel may, if desired, be fitted with a tire.

An extension arm or lug 19 extends upwardly from the spine 18 and is provided with a bore for receiving a shaft 20 extending substantially parallel to the spine. As shown in FIG. 1, the shaft is provided with screw-threaded portions 21, 22 adjacent each end and with a pair of locknuts 23, 24 for locking it to the lug 19. The threads 22 are engaged with a screw-threaded bore in a boss 26 provided on an extension 27 of the arm 16 and this end of the shaft is provided with a turning knob 25. The threads 21 are engaged with a screw-threaded bore in a boss 28 provided on an extension 29 of the arm 17.

The penetration depth of the coulter 13 can be adjusted, by slacking the lock nuts 23, 24 and then turning the shaft 20, by means of the knob 25, in one direction or the other, to draw the extensions 27 and 29 closer together or to move them further apart. This has the effect, in one case, of moving the wheels 14, 15 away from each other and thus lowering the coulter 13 and, in the other case, of moving the wheels towards each other and thus raising the coulter.

The unit is adapted for attachment to the transverse tow bar of a tractor or other vehicle by means of a pair of plates 31 which, in the form illustrated in FIGS. 1 and 2, are pivotally connected to the spine 18 by a shaft 32, a parallel linkage consisting of bars 33, 34 and pivot pins 35, 36, and a second pair of plates 37. In the mode illustrated in FIGS. 1 and 2, the plates 37 can be adjusted to the height of the tow bar of the towing vehicle by means of the parallel linkage, without affecting the height of the unit, and hence the depth of the coulter 13, because the plates 31 are free to pivot with respect to the spine 18.

In the modified mode illustrated in FIG. 3, the front wheel 15 and arm 17 and extension 29 are removed and replaced by a disc coulter 40 which is rotatably mounted on an arm 41. The arm is provided with flanges 42 (only one shown) extending perpendicularly to the plane of the arm by means of which the arm can be secured to the spine 18 by bolts 43 passing through apertures in the flanges 42. As shown in FIG. 3, the disc coulter may be provided with soil scrapers 44 and a stone guard or deflector 45 in a conventional manner.

In this modified mode, the plates 31 are locked against rotation with respect to the spine 18 by means of a shaft 38 passing through aligned bores in the plates and spine and secured in position by a split pin 39. Furthermore, the shaft 20 is replaced by a shorter shaft having only the screwthreaded portion 22, lock nuts 23, 24 and turning knob 25. The runner-type coulter 13 is retained for the purposes of consolidating the furrow made by the disc coulter 40 and for deflecting seeds from the metering device 10 in the manner described in Gilles et al U.S. Pat. No. 3,880,100. With this arrangement, the depth of the coulters is adjusted by turning the shaft and thus moving the rear wheel 14 towards or away from the coulter 13 and by adjusting the height of the tow bar on the towing vehicle which adjusts the height of the spine 18 by means of the parallel linkage between the plates 31 and 37.

Figure 4:
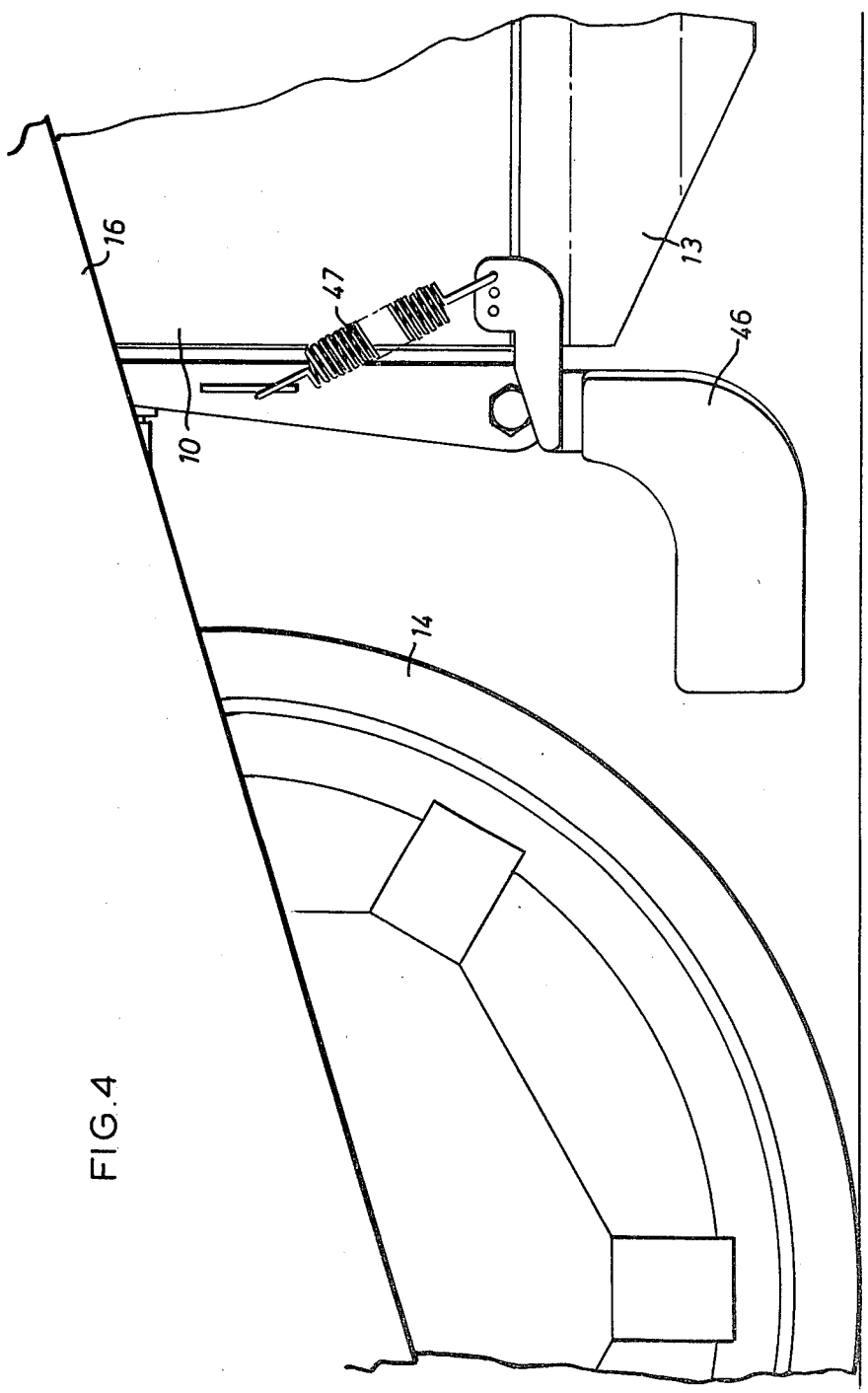
FIG. 4 is a detailed view, to an enlarged scale, of one form of furrow closing member which can be fitted to the unit illustrated in FIGS. 1 to 3.
Figure 5:
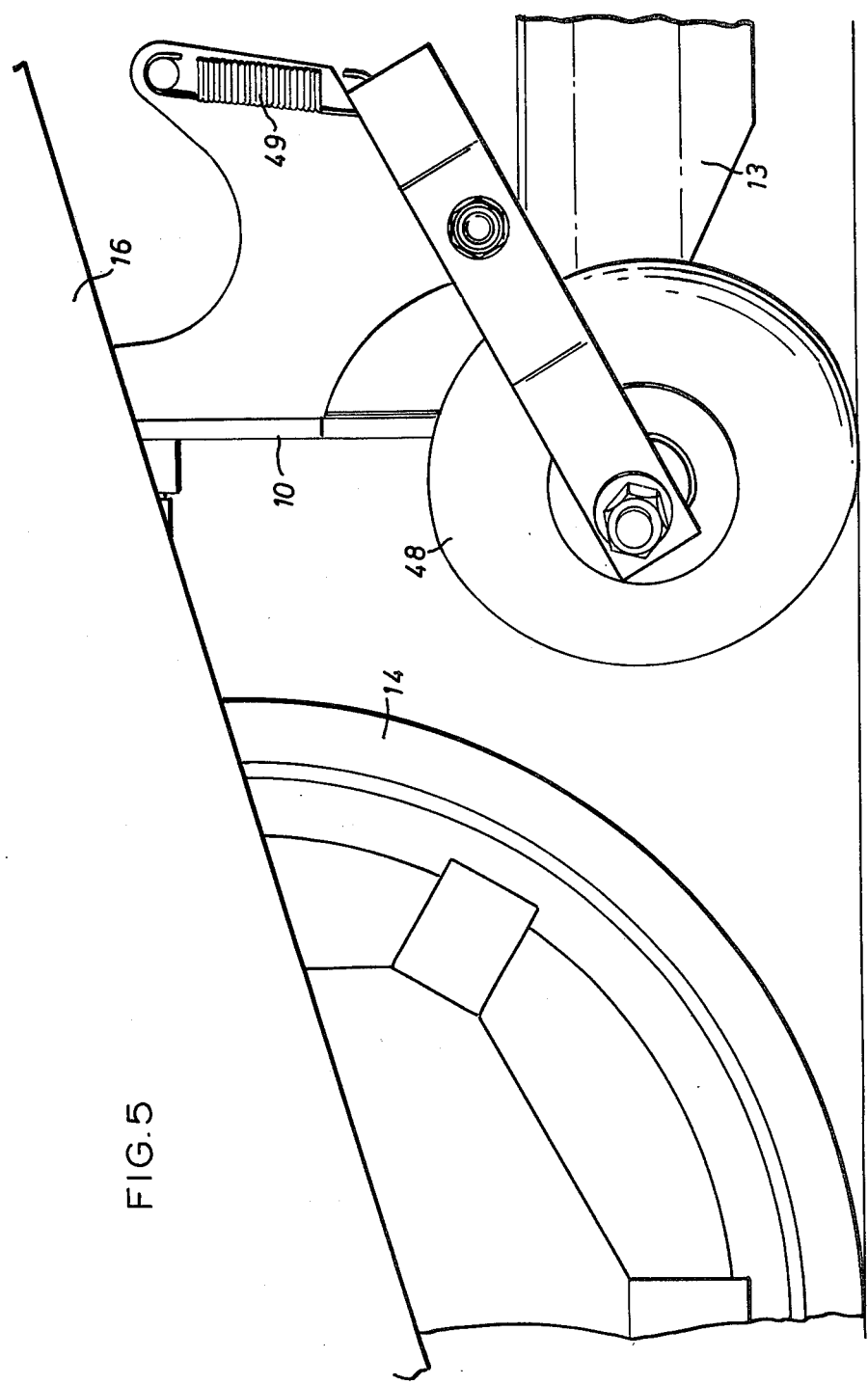
FIG. 5 is a view, corresponding to FIG. 4, of an alternative form of furrow closing member.

Further details of the construction and operation of the seed drilling unit will be apparent from the description and drawings of U.S. Pat. No. 3,880,100. The furrow formed by the coulter 13 and, if fitted, the disc coulter 40 can be closed either by a blade-type coverer or closing member 46 as shown in FIG. 4 or by a disc-type coverer or closing member 48 as shown in FIG. 5. In either case, the closing member is preferably urged into its operative position by a respective spring 47 or 49.

I claim:
1. In a towable seed drilling unit of the type comprising:
   a seed hopper;
   a seed chamber communicating with said seed hopper and having a floor formed by a portion of the lower run of an endless belt which is perforated by at least one row of holes along its length, each hole in said belt being sized to contain a single seed;
   a masking plate located below said endless belt and arranged to unmask at least one hole in said endless belt through which a seed may fall;
   a coulter located beneath said seed chamber for forming a furrow ahead of said unmasked hole;
   a furrow closing member located behind said seed chamber for closing said furrow formed by said coulter;
   a ground contacting front wheel located in front of said coulter;
   a ground contacting rear wheel located behind said furrow closing member;
   drive means operably associated with said rear wheel and with said belt for driving said lower run of said endless belt in a direction opposite the direction in which said towable seed drilling unit is towed;
   a first arm adapted to carry said front wheel and being pivotal about a first substantially horizontal axis;
   a second arm carrying said rear wheel and being pivotal about a second substantially horizontal axis; and
   means for adjusting the attitude of the first and second arms relative to the remainder of the unit thereby to adjust the penetration depth of the coulter;
   the improvement wherein said towable seed drilling unit includes a main frame supporting the said front and rear wheels, a four-bar parallel linkage having a front connecting means adapted for connection to a towing vehicle tow bar, a shaft member pivotally connected to said main frame and forming a rear bar of said parallel linkage oriented parallel to said tow bar, and detachable means for locking said member to said main frame to render said parallel linkage static relative to said tow bar whereby the penetration depth of said coulter is determined by said adjusting means, said detachable means being operable selectively to release said member from said main frame and said front wheel being removable from said unit to render said parallel linkage freely pivotable relative to said tow bar whereby the penetration depth of said coulter is determined by the relation of the towing vehicle to said towable seed drilling unit.

2. A towable seed drilling unit as claimed in claim 1 and including a disc-type coulter for attachment to said main frame in replacement of said front wheel.

3. A towable seed drilling unit as claimed in claim 1, in which said means for adjusting the attitude of the first and second arms relative to the remainder of the unit comprises a manually operable screw engageable with an extension of each of said arms.

4. A towable seed drilling unit as claimed in claim 1 in which said adjusting means comprises a manually operable screw arranged to act on said second arm carrying said rear wheel.

5. A towable seed drilling unit as claimed in claim 1 in which said parallel linkage connecting means comprises at least one plate which is pivotally connected to said main frame, and means for selectively locking said plate against pivotal movement.

6. A towable seed drilling unit as claimed in claim 5 in which said means for locking said plate against pivotal movement comprises a shaft passing through said plate and said main frame.

* * * * *